(No Model.)

F. A. MAGOWAN & R. M. BASSETT.
MANUFACTURE OF POTTERY.

No. 290,443. Patented Dec. 18, 1883.

Witnesses
J. Staib
Chas. H. Smith

Inventor
Francis A. Magowan
Royal M. Bassett
per Lemuel W. Serrell
Atty

UNITED STATES PATENT OFFICE.

FRANCIS A. MAGOWAN, OF TRENTON, NEW JERSEY, AND ROYAL M. BASSETT, OF BIRMINGHAM, CONNECTICUT.

MANUFACTURE OF POTTERY.

SPECIFICATION forming part of Letters Patent No. 290,443, dated December 18, 1883.

Application filed September 10, 1883. (No model.)

*To all whom it may concern:*

Be it known that we, FRANCIS A. MAGOWAN, of Trenton, in the State of New Jersey, and ROYAL M. BASSETT, of Birmingham, in the State of Connecticut, have invented an Improvement in the Manufacture of Pottery, of which the following is a specification.

In the manufacture of pottery it is usual to employ plaster molds, in order that the same may absorb the moisture from the clay and allow the clay to shrink away from the mold and easily separate. With articles turned or spun upon a jigger or lathe, great inequalities exist both in weight and thickness, causing unequal shrinkage, lack of uniformity, and considerable loss in the manufacture. It is generally necessary to sponge off the goods to render the surface smooth, and the marks or stamps have to be applied by hand. Efforts have been made to press clay goods in molds; but it is necessary to separate such clay goods from the molds while in the press, or to have a large number of molds, so that the article can remain in the mold and partially dry and shrink after removal. Under any circumstances the surfaces of the goods are liable to be rough and uneven, in consequence of the molds being of cast-iron and more or less porous.

Our improvements are made for lessening the labor in the manufacture of china, earthenware, and other clay goods, especially such plain articles as saucers, plates, cups, &c., for rendering the clay and other materials so used more dense and free from blisters or air-cells, and the article stronger, for making the surface perfectly true and smooth, and for drying and hardening the ware, so that it may be placed in the saggers for burning or firing. We accomplish these objects by making use of a powerful press—such as a hydraulic press—and metal molds—such as hollow cast-iron molds—heated by steam or other artificial heat, and the molds have movable surfaces of thin material—such as sheet metal, rubber, or paper, or both—and the clay is in a moist and heated condition, preferably rendered so by the direct action of heat and moisture.

Figure 1:
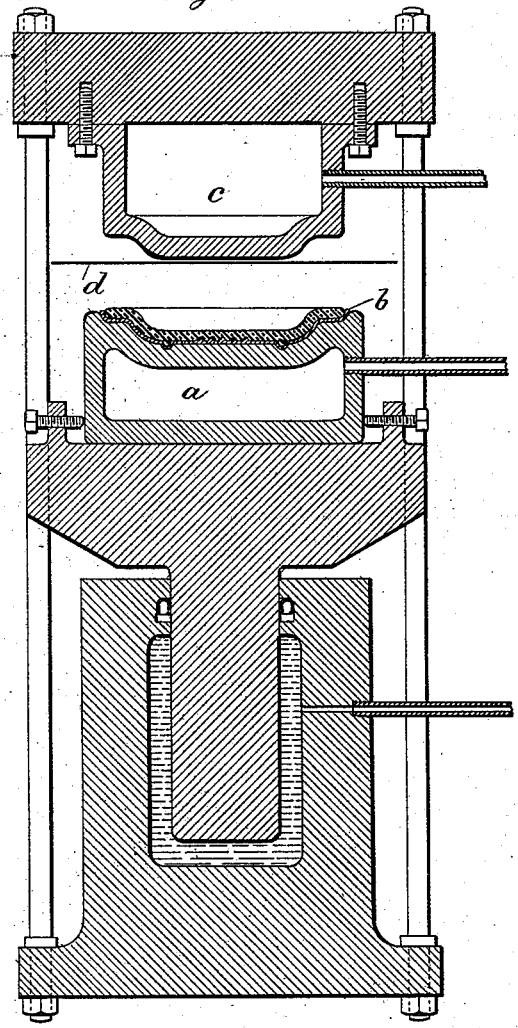
Figure 2:
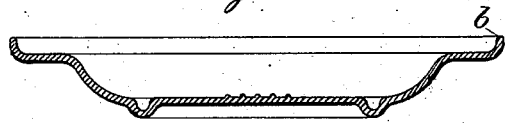

In the drawings, Figure 1 is a vertical section, illustrating our improvement; and Fig. 2 is a separate view of the lining for the mold.

In the manufacture of articles—such as plates or saucers, or flaring bowls or cups—we make use of a hollow die, $a$, of cast-iron, with a movable lining, $b$, of sheet metal, and a plunger or follower, $c$, also of cast-iron, hollow, and a movable surface of thin sheet material—such as india-rubber—at $d$. The clay is introduced between these and pressed until the dies come to the proper proximity to each other, the surplus clay being allowed to escape all around the edges of the movable lining, or through small openings at the edge especially provided, the surplus being removed by the finger or a suitable instrument. In some instances the clay may be weighed out before being introduced into the mold, and the mold made so as to close tightly, thereby subjecting the clay to the entire pressure of the hydraulic or other power. The dies $a$ $c$, being hollow, can be heated by steam or artificial heat, if desired.

The objects which we have in view and which are accomplished are as follows: The lining of sheet metal or other thin materials, being spun up or otherwise formed to shape, is to have a perfectly-smooth surface, free from flaws, holes, or imperfections that are likely to exist in the cast-iron or plaster molds; hence the pottery-ware will be perfectly smooth and will not require to be sponged or handled. The manufacturers' names or trade-marks being placed on these sheet-metal linings, the pottery or ware is marked at the first operation, and one step in the ordinary process is saved. The lining, being removable from the mold, allows for lifting out the article and prevents any risk of the article sticking in the mold itself, and allows for the cast-iron mold being adapted to immediate use by a rough finish. The linings are more durable than the dies or molds that have before been used, and they are not as liable to be broken and chipped as the molds of plaster before employed. The linings of sheet material, after giving shape to the ware, become supports for the clay goods while being handled, and risk of warping or injury is prevented. When the molds are heated, they impart their heat to the linings and to the clay, and the clay is dried much quicker than heretofore, and the lining, imparting its heat to the clay, causes such clay to shrink away and become detached from the lining, so that the two are easily separated. The india-rubber or other elastic material, being in the form of a very thin sheet, accommodates itself to the surface of the die or mold under the pressure upon the clay; hence all the delicate patterns or designs that may be in the plunger or die appear upon the clay, and the elastic material simply requires to be held by the workman, so that it does not become creased or folded. When the dies separate, the sheet of elastic material, contracting, draws out the portions of clay that may have become indented into the cavities in the die, thus keeping the die itself perfectly clean, and at the same time causing the clay article to separate easily from the surface of the clay and the elastic sheet to separate from the clay.

The clay or materials used being subjected to a very great pressure, but little water is required to render the same adhesive, and the goods dry quicker and shrink less than heretofore.

It is preferable to use both the lining of sheet metal and the movable surface of elastic material; but in some instances they may be separately used, and other material than sheet metal having equivalent properties may be used for the lining, and the movable surface may be of equivalent material to the thin sheet-caoutchouc.

This improvement may be used in the manufacture of cups, saucers, plates, bowls, saggers, and pipes in clay, or in a mixture of clay and other material, such as used in terra-cotta and other wares.

We do not claim an elastic lining to the mold nor a mold that is movable from the press. By the use of a thin sheet-metal lining we are able to lift the goods out of the mold and to handle them without injury, and they retain their shape while drying.

We claim as our invention—

1. In combination with the molds for pressing clay goods, a lining of sheet metal or equivalent rigid material introduced into the mold, and upon which the clay is pressed, substantially as set forth.

2. In combination with heated dies and mechanism for applying a pressure to such dies, the movable metallic lining that becomes heated by such dies and acts to warm and dry the clay article pressed to such movable lining, substantially as set forth.

3. The method herein specified of pressing clay goods and discharging the same from the molds, consisting in placing a sheet-metal form upon the lower die, and a thin sheet of elastic material between the clay and the upper die, to prevent the adhesion of the clay to the die, and itself to become easily separated from the clay article after pressure by the dies, the sheet-metal form supporting the article until it is set.

Signed by us this 5th day of September, A. D. 1883.

F. A. MAGOWAN.
ROYAL M. BASSETT.

Witnesses:
GEO. T. PINCKNEY,
WILLIAM G. MOTT.